United States Patent [19]

Kelly et al.

[11] 4,337,290
[45] Jun. 29, 1982

[54] HIGH IMPACT RESISTANT LAMINATE SURFACE FOR A BOWLING LANE

[75] Inventors: Peter B. Kelly; Edward R. Heagle, both of Coshocton, Ohio

[73] Assignee: General Electric Company, Coshocton, N.Y.

[21] Appl. No.: 95,120

[22] Filed: Nov. 16, 1979

[51] Int. Cl.³ .................. B32B 3/00; A63D 1/04; B32B 17/08; B32B 23/06
[52] U.S. Cl. .................. 428/201; 156/222; 156/288; 156/335; 273/51; 428/151; 428/153; 428/203; 428/204; 428/206; 428/207; 428/211; 428/302; 428/438; 428/531; 428/535
[58] Field of Search ............... 428/151, 153, 154, 195, 428/201, 302, 323, 331, 451, 501, 502, 516, 211, 207, 438, 204, 203, 531, 206, 535; 156/222, 224, 289, 288, 335, 62.2; 273/51

[56] References Cited

U.S. PATENT DOCUMENTS

| | | | |
|---|---|---|---|
| 1,655,933 | 1/1928 | Allen | 428/438 |
| 2,531,168 | 11/1950 | Snyder | 273/51 |
| 2,605,205 | 7/1952 | Patterson et al. | 428/203 |
| 2,816,851 | 12/1957 | Arledter | 428/211 |
| 3,135,643 | 6/1964 | Michl | 428/297 |
| 3,373,070 | 3/1968 | Fuerst | 428/451 |
| 3,373,071 | 3/1968 | Fuerst | 428/451 |
| 3,581,698 | 6/1971 | Bete | 428/438 X |
| 3,663,341 | 5/1972 | Veneziale | 428/203 |
| 4,231,573 | 11/1980 | Kelly | 428/204 X |

Primary Examiner—Thomas J. Herbert, Jr.
Attorney, Agent, or Firm—Hedman, Casella, Gibson & Costigan

[57] ABSTRACT

An improvement in a bowling lane having a decorative laminate surface which improvement comprises incorporating into the core of the laminate a plurality of alternating layers of glass cloth impregnated with a thermosetting resin and crepe paper also impregnated with a thermosetting resin, the glass cloth and crepe paper being interlaminarily bonded to one another.

12 Claims, No Drawings

HIGH IMPACT RESISTANT LAMINATE SURFACE FOR A BOWLING LANE

BACKGROUND OF THE INVENTION

1. Field of Invention

This invention relates to new and improved laminates for bowling lane structures. More particularly, it relates to new and improved high impact resistant surfaces for bowling lanes.

2. Description of the Prior Art

Standard bowling lanes are often constructed of suitably finished hardwood blocks or planking. In such a lane bed, usually about 41 to 42 inches wide, the construction typically consists of from about 39 to 42 maple planks or boards about one inch thick laid edgewide in line with the longitudinal axis of the lane. The surface of the lane is made flat and coated with varnish or lacquer which is then treated as with mineral oil to reduce wear and adjust the coefficient of friction or slippage of the surface in order to produce uniform action and control of the bowling ball. The surface finish consists typically of a nitrocellulose or polyurethane lacquer which can be treated with plasticizers and other additives to provide with the oil treatment the desired wear and slippage or friction characteristic.

While wooden lanes have been in use for many years they are subject to a number of deficiencies. For example, present wooden lanes can be easily and severely damaged in the areas of ball release and at the pin deck. Such damage in the ball release area is intensified by lofted bowling balls which, upon impact, dent the lacquered and oiled wooden surface. Even normal releases of the ball damage the lane albeit to a lesser degree. Surface damage in the pin deck area is primarily caused by contact of the struck pins with the surface. Under ordinary circumstances, standard bowling lanes are inspected and often sanded and refinished on an annual basis. Such refinishing is necessary in order to meet set bowling standards and in order to provide uniformity of all lanes so that comparable performance and scoring can be attained insofar as these factors are controlled by the physical condition of the bowling lane itself as opposed to the skill of the bowler.

Materials other than wood have been suggested for use in bowling lanes. For example, U.S. Pat. No. 2,531,168 teaches a top surface layer for bowling alleys formed of laminated plastic compounds such as phenolic, vinyl, acrylic, cellulose acetate, etc. And U.S. Pat. No. 3,014,722 discloses bowling alley lanes formed of sections of laminated fibrous sheet material plies. Other materials have also been disclosed in U.S. Pat. No. 3,670,049 (a moisture curable polyurethane coating composition suitable for finishing bowling lanes); U.S. Pat. No. 3,670,060 (metal bowling alley lanes); U.S. Pat. No. Re. 25,496 (granite as a material for fabricating bowling alley lanes); U.S. Pat. No. 2,679,396 (hard rubber as a bowling alley lane material); and U.S. Pat. No. 2,193,468 (grass like carpet useful in covering a game alley). None of these wood substitutes have proven to be commercially acceptable and wood lanes predominantly remain the materials in common usage today.

U.S. Pat. No. 3,663,341 discloses the use of a fiberglass-kraft paper laminate (See column 2, lines 3,4 and 21).

Japanese application No. SHO-50-111020 laid open for inspection on May 18, 1976 as Publication No. SHO-51-56548, corresponds to U.S. patent application Ser. No. 506,069, filed Sept. 16, 1974, now abandoned, (the disclosure of which was carried forward in U.S. patent application Ser. No. 926,604, filed July 21, 1978, now U.S. Pat. No. 4,231,573 [hereinafter the '604 application]) and discloses a high pressure laminate surface suitable for bowling alley lanes. These bowling lane surfaces have been successfully tested in the United States and been welcomed as an advance in the art. See e.g. *Bowling* January, 1977 at page 6.

The '604 application discloses a bowling lane surface which is a wear and impact resistant decorative plastic laminate having a plurality of thermosetting resin impregnated decorative fibrous print sheet and an overlying melamine resin-containing protective layer, the decorative surfacing being in the form of panels which can be cemented, fixed or suitably adhered to the lane substrate which can be of wood as above or of hardboard, plywood, flakeboard, chipboard or the like, or even of concrete, cement-asbestos board, filled asphalt, stone or metal sheets as desired. The laminate surface is so constructed as to approximate the same reaction to ball delivery as wooden lanes. It has also been suggested that the lane surface be made of sheets of resinous material such as phenolformaldehyde and the like.

SUMMARY OF THE INVENTION

Objects of the Invention

The above described difficulties indicate that there is a need for bowling lanes and surfaces which are more resistant to physical abuse and wear, which have uniformity of surface and which can maintain these qualities over a long period of time. Of particular interest in this respect are the resistance of the surface to bowling ball impact, a suitable coefficient of friction and a resistance to abrasion which, in combination with the mineral oil dressing applied to the lane, will give both an optimum wear resistance and simultaneously provide the proper slippage to the thrown ball so that uniform ball action will result on any lane so surfaced when thrown in the same manner.

The bowling lane and surface described in the '604 application, assigned to the same assignee as this application, responds, in part, to this need. The surface of the bowling lane produced according to the '604 application is characterized by a falling ball impact resistance of at least 60 inches, a coefficient of friction of about 0.18 and a Taber abrasion resistance of at least about 500 cycles.

As prevously indicated hereinabove, the bowling lane and surface disclosed in the '604 application has made for a significant advance in the art. The present invention is considered to be an improvement on the invention of the '604 application and its main features and objectives are thus similar to the '604 application.

Experience gained in developing the invention of the '604 application has indicated the desirability of product improvements and has led to the conception and development of the present invention which has, in addition to the advantages and features of the earlier invention, improved impact resistance. The bowling lane and surface of the present invention provides a crack-resistant laminate surface.

It is, therefore, a primary objective of this invention to provide bowling lanes and surfaces for bowling lanes which are extremely resistant to cracking during usage thereof.

Another object is to provide bowling lanes and surfaces therefor which incorporate glass cloth and crepe paper into the core of a laminate surface thereof.

Still another object of this invention is to provide a decorative plastic laminate which may be overlaid onto the surface of a wooden bowlng lane to provide a new surface therefor having superior impact resistance.

An object of this invention is to provide an interlaminar bond between theremosetting resin impregnated layers of glass cloth and crepe paper which is as strong as the interlaminar bond between similar thermosetting resin impregnated layers of Kraft paper.

These and other objects will readily become apparent to those skilled in the art in the light of the teachings hereinafter set forth.

Brief Summary of the Invention

According to the present invention, there are provided particular decorative plastic laminates having an improved thermosetting resin impregnated core comprised of glass cloth and crepe paper substrates impregnated with a thermosetting resin. The core is overlaid with a decorative layer and a protective thermosetting resin impregnated paper overlay or thermosetting resin overlay coating. The laminates are used to provide improved bowling lanes and surfaces therefor.

Detailed Description of the Preferred Embodiments

It has been found that the impact resistance of the laminate surface described in the '604 application could be more than doubled by replacing the plurality of thermosetting resin impregnated paper fiber core sheets with a core comprised of a plurality of alternating sheets of thermosetting resin impregnated glass cloth and thermosetting resin impregnated crepe paper. Moreover, the laminate surface of the present invention has substantially the same thickness of the laminate of the '604 application.

Including glass cloth or glass net having 10 strands per inch in the core of the laminate of the '604 application greatly increases the impact resistance, but at the cost of decreasing the strength of the glass to paper interlaminar bond. Consequently, although such a system provides excellent impact resistance initially, delamination may occur upon repeated impacts from a bowling ball. However, applicant has found that when crepe paper is substituted for the Kraft paper immediately adjacent to the glass net or cloth, an excellent interlaminar glass to paper bond may be achieved. It is believed that this is due to the irregularities of the crepe paper conforming to the weave of the glass cloth or net providing a greater interfacial contact area between the paper and glass. Indeed, applicant has found that the interlaminar bond strength between a glass net sheet or glass cloth sheet and crepe paper sheet is as good as the interlaminar bond between resin impregnated paper sheets in the laminate of the '604 application.

It has been found that bowling lane surfaces in accordance with the present invention are comparable in other respects to the bowling lane surfaces of the '604 application and have a NEMA Standard 8-19-64 falling ball impact resistance of over 60 inches as compared to 32 inches for a typical varnished or lacquered hardwood lane. When a 16-pound standard bowling ball was dropped on the bowling lane of this invention from a height of 3 feet, there was no effect. Both with polyurethane varnish and the nitrocellulose lacquer treated wooden bowling lanes, a deep surface dent resulted from such treatment and the wood fibers of the surface were torn. As measured by the Taber abraser, the NEMA Standard 8-20-1962 abrasion resistance of the present lanes is from about 500 cycles to 2500 cycles depending on the particular surface, whereas the polyurethane varnish and nitrocellulose lacquer finished lanes have a Taber abrasion resistance of 40 cycles and 25 cycles respectively. The resistance of the present surfaces to a burning cigarette in accordance with NEMA Standard 8-19-64 is 300 seconds as opposed to 90 seconds to charring for the polyurethane varnish and 24 seconds to burning with the nitrocellulose lacquer. The slip or coefficient of friction of the present surfaces is 0.18 as compared to 0.18 for typical polyurethane varnished layers and 0.16 for typical nitrocellulose lacquer coated lanes, all measurements being taken with an oil-treated surface. The present surfaces are furthermore resistant to staining by alcohol, detergent, shoe polish, and mustard whereas polyurethane varnished surface lanes are stained by mustard, and nitrocellulose lacquer surface lanes are stained by alcohol, shoe polish and mustard. The 60 degree gloss of the present lanes is also comparable to those of present hardwood lanes surfaced with nitrocellulose lacquer.

Any of a number of substrates can be used in connection with the surface of the present invention including natural wood such as maple planks and consolidated wood fibers, plywood, flakeboard, chipboard and hardboard. Also useful but less preferred are materials such as concrete, cement-asbestos board, filled asphalt, stone and metal sheets, the non-flammable materials being useful where fire resistance is desirable.

The bowling lane surfaces or laminates of the present invention are readily made. The core sheets are alternately laid together and comprise crepe paper and glass cloths or net which can be impregnated with any of the thermosetting resins conventionally used in the production of decorative laminates. The most common of these resins are alkali catalyzed condensation products of a phenol and an aldehyde. A specific phenolic resin used in this connection is a light colored, thermosetting, general purpose phenol formaldehyde resin of the above description sold by the Monsanto Company under the name of Resinox 470. An epoxy resin may be employed to impregnate the glass sheets in lieu of a phenolic resin if desired. Suitable epoxy resins include both the glycidyl ether type and cyclic ether type. The digycidyl ether of bisphenol A in combination with an aromatic trianhydride is a preferred epoxy composition.

As in typical decorative laminates, the core sheets of creped Kraft paper or selected combinations of such papers are overlaid with a so-called print sheet which imparts the decorative effect as of wood grain or any other finish to the laminate. While the print sheet can be impregnated as is usual in ordinary decorative laminates, it has been found that a lesser amount than usual of the thermosetting resin impregnant is desirable in the print sheet to toughen the surface of the laminate and make it more impact and fracture resistant so that the surface is more resistant to grooving and denting. Any of a number of thermosetting resins can be used for impregnating the print sheet where this is indicated including, preferably, a condensation product of melamine and an aldehyde, such materials being characterized by excellent abrasion resistance, translucency and resistance to discoloring. A specific material found useful in this connection is a modified melamine formaldehyde reaction product sold by American Cyanamid Comany under the name of Cymel 428. This resin is commercially available as a white, free-flowing powder and is specifically designed for the treatment of paper to be used in decorative laminates. The powdered resin is readily soluble in water or in alcohol-water solvents and gives a clear, colorless solution which is stable at 50 percent by weight solids content for at least two days at room temperature. Typical properties of a 50 percent aqueous solution of this resin at 25° C. include a pH of 8.8 to 9.6, a Gardener viscosity of A to B, and a solids content at maximum dilution in water of 26 percent. However, other resins such as ureas, aminotriazines, light highly purified phenolic resins, polyester resins including unsaturated alkyd-vinyl monomer types, acrylics, ethoxyline resins and the like can also be used. Among the melamine resins which can be used are the several more fully described in U.S. Pat. No. 2,604,205. In preparing the plastic laminate, the alternating sheets of crepe paper and glass cloth or net in the core are impregnated in any desired manner with their respective thermosetting resins and dried, the resin content of the dried core paper sheet before consolidation ranging generally from about 34 to 37 percent by weight of resin for the normally used creped Kraft paper and from about 40 to 50 percent by weight of resin for the glass cloth or net.

Where a paper overlay or protective layer is used, this is normally of a highly purified, transparent, alpha cellulose although it can also consist of other transparent or highly translucent cellulosic or synthetic resin fibers such as those of rayon or mixtures of such fibers such as those described in U.S. Pat. No. 2,816,851, among others. This material is impregnated with a melamine resin such as that previously described for the print sheet and usually treated to a resin content of from about 58 to 67 percent by weight before consolidation.

If desired, the abrasion and wear resistance of the paper layer can be increased by incorporating abrasive materials such as finely divided silica, silicon carbide, emery, diamond, tungsten carbide, titanium carbide, boron nitride, aluminum oxide and mixtures of such materials with each other and with other finely divided materials, the wear or abrasion resistance of the overlay being specifically tailored as desired by using materials of the desired hardness. These materials can be uniformly distributed throughout the overlay as by the teaching of U.S. Pat. No. 3,373,070, to give uniform abrasion resistance as the overlay is worn away or they can be concentrated in the surface of the overlay or graded through the thickness of the overlay as desired.

In lieu of the thermosetting resin impregnated paper overlay, there can be used a thermosetting resin as such or compositions which take the place of the overlay. Typical of such thermosetting resin composition overlays are those described in U.S. Pat. Nos. 3,135,643 and 3,371,071 which are included by reference herein. According to these patents, a surface coating composition for decorative laminates is provided comprising a thermosetting resin of silica flour and a finely divided fibrous material in the form of discrete fibers. The silica flour and the finely divided fibrous material have a refractory index approximating that of the cured thermosetting impregnating resin where a transparent or highly translucent effect is desired. It will be realized, or course, that the silica flour can be substituted wholly or in appropriate amounts by the other hard materials, including those mentioned above, to obtain good abrasion resistance and transparency effect. This coating composition greatly improves the abrasion resistance of the laminates to which it is applied.

The following examples illustrates at least one of the best modes of the method and products of the present invention as presently understood.

EXAMPLE 1

This example illustrates a bowling lane having a decorative laminate surface incorporating a thermosetting resin impregnated paper overlay. There was prepared an overlay of alpha cellulose paper impregnated with a 50 percent water solution of melamine formaldehyde resin, specifically Cymel 428, the impregnated paper being dried to a resin content of 65 percent by weight. There was also prepared in a similar manner core layers of 140 pound basis weight creped Kraft paper which were impregnated with a 50 percent solution of standard alkaline catalyzed phenol-formaldehyde resin, the dried resin content of each such core layer being about 30 percent by weight. Also prepared were treated plies of 7628 type glass cloth impregnated with a 60 percent solution of epoxy resin; the dried resin content of each such core layer was about 50% by weight. The laminate was prepared by successively superimposing the phenolic impregnated Kraft paper sheet, two phenolic resin impregnated creped Kraft paper sheets, one epoxy resin impregnated glass sheet, one phenolic resin impregnated creped Kraft paper sheet, one epoxy resin impregnated glass sheet, one phenolic resin impregnated creped Kraft paper sheet, one 55 pound basis weight raw or unimpregnated print sheet and a melamine resin impregnated overlay paper as described above. The laminate so laid up was placed between polished stainless steel panels and cured for 15 to 18 minutes at 130° to 135° C. at 1500 psi, the laminate then being cooled still under pressure to below 40° C. and removed from the press. Actually, the laminating process is of a time-temperature-pressure nature and suitable laminates can be prepared by curing for from about 20 to 25 minutes at from about 130° C. to 150° C. at pressures ranging from about 1000 psi to about 1500 psi. The resulting laminate was 130 mils thick and was sanded to a 125 mil thickness. As intimated above, the less melamine present in the print, the tougher the surface and the more impact and fracture resistant it is. Thus, in this example, a raw or unimpregnated print layer was used so that it could be impregnated by melamine resin migration from the melamine resin impregnated overlay paper. The finished laminate was cut to size and cemented using contact cement to an existing hardwood bowling lane. Joints between laminate sheets were filled with elastomeric material, specifically RTV silicone caulk. Other useful caulks are well known and include both polyurethane and polysulfide materials.

EXAMPLE 2

This example illustrates the practice of the present invention using in lieu of a resin impregnated paper overlay a thermosetting resin layer. The core sheets of this example were prepared as in Example 1. In lieu of the overlay sheet, an abrasion resistant, thermosetting resin composition was used prepared in accordance with Example 1 of U.S. Pat. No. 3,373,071 incorporated herein by reference. This thermosetting resin composition was prepared by mixing in a high shear blender 64 parts of water, 12.5 parts of sodium carboxyl methyl cellulose in 2 percent concentration and 10 parts of finely divided silica, there being added after mixing 100 parts of melamine resin, specifically Cymel 428, with further mixing to which resulting mixture there was added again with thorough mixing 10 parts of Avicel microcrystalline cellulose. This resinous composition, diluted to 50 percent solids in water, was used to impregnate a 55 pound basis weight print sheet to a dried resin composition content of 50 percent by weight. The various layers were then superimposed one upon the other and pressed under heat as described in Example 1 to produce a laminate having an unsanded thickness of 130 mils which was reduced by sanding the back or core side to a final total thickness of 125 mils. The finished laminate was cut to size and cemented, using contact cement, to an existing hardwood bowling lane. Joints between laminate sheets were filled with elastomeric material, specifically the material of Example 1.

The following table shows the results of various tests performed on bowling lanes surfaced with the material of Examples 1 and 2 as compared with standard bowling lanes finished respectively with polyurethane varnish and nitrocellulose lacquer, all tests being carried out in accordance with NEMA publication LD 1-1964.

NATIONAL ELECTRICAL MANUFACTURERS ASSOCIATION STANDARD TESTS (NEMA Pub. No. 1-64)

| Test | Example 1 | Example 2 | Polyurethane Varnish | Nitrocellulose Lacquer |
|---|---|---|---|---|
| Impact falling ball | 60 inches | 60 inches | 32 inches | 30 inches |
| Impact *16 pound bowling ball, 3 feet | No effect | No effect | Deep dent, torn wood fibers | Deep dent, torn wood fibers |
| Abrasion Resistance (Taber) | 500 cycles | 2500 cycles | 40 cycles | 25 cycles |
| Cigarette Resistance | 300 seconds | 300 seconds (charred) | 90 seconds (charred) | 24 seconds (on fire) |
| Hardness Rockwell M | | 114 | Too soft to measure | |
| Barcol | | 65 | 0 | 0 |
| Coefficient of Friction | 0.18 | 0.18 | 0.18 | 0.16 |
| Staining | | | | |
| Alcohol | No | No | No | Yes |
| Detergent | No | No | No | No |
| Shoe polish | No | No | No | Yes |
| Mustard | No | No | Yes | Yes |
| Gloss, 60° | | | | |
| Length | | 75 | 74 | 62 |
| Cross | | 72 | 68 | 44 |

*Improved test using the surfaces indicated by the respective column headings.

The above shows that the bowling lanes of the present invention surfaced with the decorative laminate surfacing materials are far and away superior to the present bowling lane surfaces from the point of view of impact and abrasion resistance. At the same time, the laminate surfaces match or very closely approximate the coefficient of friction of the varnished or lacquered surfaces so that slippage and control of the ball on the mineral oil dressed lane is not changed. This is borne out by the experience of bowlers using the new lanes.

EXAMPLE 3

This example illustrates the high impact resistance provided by incorporating glass and crepe paper into the core sheets of the decorative laminate surface of a bowling lane according to the present invention. An overlay sheet and core layers of 140 pounds basis weight creped Kraft paper were prepared as described previously herein in example 1. Six laminates were prepared by successively superimposing one phenolic impregnated Kraft paper sheet, eleven or fifteen alternating sheets of a glass material, and a phenolic resin impregnated creped Kraft paper sheet, one 55 pound basis weight melamine resin impregnated print sheet and a melamine resin impregnated overlay paper as described in example 1.

Each laminate so laid up was placed between polished stainless steel panels and cured for about 17 minutes at 135° C. to 145° C. at 1400 psi, the laminate then being cooled still under pressure to below 40° C. and removed from the press. Actually, the laminating process is of a time-temperature-pressure nature as indicated in example 1 previously herein. The resulting laminate was 130 mils thick and was sanded to a 125 mil thickness (a raw or unimpregnated print layer could be used, if desired, so that it could be impregnated but not excessively by reason of melamine resin migration from the melamine resin impregnated overlay paper).

The finished laminate was cut to size and cemented using contact cement to 12 inch by 15 inch blocks made by nailing two ½ inch thick 60-pound density fiberboards to either side of two ⅝ inch thick underlayment grade 45-pound density flake boards. The laminate clad blocks were laid on a concrete floor and impacted by dropping a 16-pound bowling ball on the blocks from vertical distances of 2 and 3 feet. The make-up of the laminates made and tested is summarized in Table II hereinbelow and the results of the tests are summarized in Table III hereinbelow:

TABLE II

Laminate 1
1 melamine resin impregnated alpha cellulose surface sheet
1 melamine resin impregnated paper sheet
{ 15 phenolic resin impregnated creped Kraft paper sheets
  15 glass cloth sheets } alternately
1 phenolic resin impregnated Kraft paper sheet Laminate 2
Same as Laminate 1 except phenolic resin impregnated glass cloth sheets were used in place of the unimpregnated glass cloth sheets.

Laminate 3
Same as Laminate 1 except that treated creped paper sheets were used in place of the treated Kraft creped paper sheets.

Laminate 4
Same as Laminate 3.

Laminate 5
1 melamine resin impregnated alpha cellulose surface sheet
1 melamine resin impregnated paper sheet
4 phenolic resin impregnated creped Kraft paper sheets
{ 11 phenolic resin impregnated creped Kraft paper sheets
  11 phenolic resin impregnated glass net sheets } alternately
1 phenolic resin impregnated Kraft paper sheet Laminate 6
Same as Laminate 1 except that the glass sheets were impregnated with an epoxy resin.

TABLE III

| | IMPACTS - 3 HITS EACH | |
|---|---|---|
| Laminate | 2-foot hit | 3-foot hit |
| 1 | 3 dents | 3 dents |
| 2 | 3 dents | 3 dents |
| 3 | 1 small break 2 dents | 3 dents |
| 4 | 1 line break 2 dents | 1 star break 2 dents |
| 5 | 3 dents | 1 star break |

TABLE III-continued

| | IMPACTS - 3 HITS EACH | |
|---|---|---|
| Laminate | 2-foot hit | 3-foot hit |
| 6 | 1 star break<br>2 dents | 2 dents<br>2 star breaks<br>1 dent |

From the results in Table III, it was observed that all of the glass/crepe assembles provided impact resistance much greater than identical assemblies without the core layers of glass and crepe paper. Typically such assemblies without the core layers of glass and crepe paper have at least 1 star break and 2 line breaks when subjected to the 2-foot drop test and at least 2 star breaks when subjected to the 3-foot drop test.

EXAMPLE 4

This example shows the thickness and impact resistance of the epoxy glass/crepe paper laminate of this invention when cemented to a bowling lane. Six laminates were prepared by successively superimposing one phenolic resin impregnated Kraft paper sheet, one phenolic resin impregnated creped Kraft paper sheet, seven alternating sheets of epoxy resin impregnated glass sheets and phenolic resin impregnated creped Kraft paper sheets, one 55-pound weight basis melamine resin impregnated print sheet and one melamine resin impregnated overlay paper sheet. The print sheet creped Kraft paper sheet, and overlay paper sheet are the same as described previously in example 3.

Each of the six laminates was placed between polished stainless steel panels and cured under the same conditions described in example 3. The cured laminates were sanded and measured for thickness at two points on each edge. The measured thickness after sanding are summarized in Table IV hereinbelow:

TABLE IV

| | LAMINATE THICKNESS IN INCHES | | | | | | | |
|---|---|---|---|---|---|---|---|---|
| | Edge 1 | | Edge 2 | | Edge 3 | | Edge 4 | |
| Laminate | A | B | A | B | A | B | A | B |
| 1 | .144 | .146 | .144 | .143 | .143 | .145 | .146 | .143 |
| 2 | .145 | .146 | .144 | .144 | .146 | .145 | .144 | .145 |
| 3 | .143 | .143 | .143 | .141 | .140 | .144 | .143 | .141 |
| 4 | .146 | .146 | .144 | .143 | .147 | .146 | .143 | .143 |
| 5 | .143 | .143 | .146 | .146 | .144 | .145 | .146 | .145 |
| 6 | .144 | .146 | .145 | .144 | .143 | .143 | .141 | .146 |

Three of the laminates were then cemented with contact cement to an actual bowling lane and impacted by dropping a 16-pound bowling ball vertical distances of 3 and 5 feet, respectively, onto the laminate surface of the bowling lane. The results of this impact tests are shown in Table V hereinbelow:

TABLE V

| | IMPACT RESISTANCE - 3 HITS EACH | |
|---|---|---|
| Laminate | Impact at 3 feet | Impact at 5 feet |
| 1 | 3 small dents | 3 samll dents |
| 2 | 3 small dents | 3 small dents |
| 3 | 3 small dents | 1 small line break<br>2 small dents |

From Tables IV and V, it can be seen that laminates having a thickness which is acceptable for bowling lanes are provided by laminates whose thickness is about that of the bowling lane laminates of the '604 application previously identified herein.

EXAMPLE 5

Four laminates were prepared using substantially the same materials and procedure described in example 4. Two of the laminates were 0.132 inches thick and the other two laminates were 0.142-0.145 inches thick. The latter two laminates had thicknesses which matched the thicknesses of laminates according to the '604 application. Two of the four laminates were prepared by successively superimposing one phenolic resin impregnated Kraft paper sheet, one phenolic resin impregnated creped Kraft paper sheet, one phenolic resin impregnated creped Kraft paper sheet and seven alternating sheets of epoxy resin impregnated glass sheets and phenolic resin impregnated creped Kraft paper sheets and the same print sheet and overlay sheet previously described herein in Example 3. The other two laminates were prepared the same way as the first two, but there were only six alternating core sheets of epoxy glass and creped Kraft paper as described herein in example 3.

After sanding their respective backs, the four laminates were cemented with contact cement to 12 inch by 15 inch blocks made by nailing two ½ inch thick 60-pound density fiberboards to either side of two ⅜ inch thick underlayment grade 45-pound density flakeboards. Each of the laminate clad blocks was laid onto a concrete floor and impacted by dropping a 16-pound bowling ball onto each of them three times from a vertical distances of 2 and 3 feet. Each of the four laminates had three dents from the hits at distances of 2 and 3 feet.

Moreover, a knife blade was hammered into each edge of the laminate and twisted. No delamination occurred. The four laminates were far superior to the laminates of the '604 application (of equivalent thickness) with respect to their resistance to impact. They also provide excellent resistance to knife delamination indicating a strong interlaminar bond between the creped Kraft paper sheets and the epoxy resin impregnated glass sheets.

EXAMPLE 6

Example 4 was repeated except that eleven alternating core sheets of epoxy resin impregnated glass net having 10 strands per inch and phenolic resin impregnated creped Kraft paper were used, two phenolic resin impregnated Kraft paper sheets were placed between the top core sheet and the print sheet, and a top sheet of foil was superimposed over the overlay sheet. The two sheets of resin impregnated Kraft paper sheets above the print sheet eliminated any potential telegraphing of the glass net onto the laminate surface because of the compressibility of the foil. The laminate so prepared had a thickness of 0.16 inches.

After sanding the back of the laminate, it was tested for impact resistance by the bowling ball drop method as described previously herein in example 3. The laminate was hit three times with a bowling ball dropped from vertical distances of two and three feet and was dented only slightly. Also, it was examined for delamination by hammering a knife blade into its corners. Resistance to delamination was found to be at least equivalent to that of the laminate of the '263 application.

The laminate was cemented to a block of wood 12 inches by 15 inches that was supported by two 2 inch×4 inch wood planks laid edgewise to simulate the normal bowling lane substructure. A bowling ball was repeatedly dropped onto the laminate from a vertical distance of 2 feet. After 53 hits, the back of the block broke, but the laminate did not.

EXAMPLE 7

Example 5 was repeated for the laminate having seven alternating layers of phenoilc resin impregnated creped Kraft paper sheets and epoxy resin impregnated glass sheets. The laminate was sanded to a thickness of 0.142–0.144 inches and was substantially flat and resistant to changes in humidity.

When subjected to the two foot drop test after being cemented to the wood block supported by wood planks as described in Example 6, the laminate withstood 2,000 two foot drops on the same place with no surface break, although there was a small fracture in the back of the laminate after 1825 hits.

EXAMPLE 8

This example shows laminates according to the present invention which can be sanded to a thickness of 0.14 to 0.145 inches and are either flat or warped slightly convexly to the decorative outer surface. Six laminates were prepared according to the procedure described in example 3. Unless otherwise indicated, the overlay sheet, print sheet and phenolic impregnated Kraft paper sheets are the same as described in example 3 previously herein. The make-up of six laminates prepared is summarized in Table VI hereinbelow:

TABLE VI

LAMINATE ASSEMBLIES

Laminate 1 - Concave warp, 0.154 inches thick 1 alpha cellulose surface sheet
1 melamine resin impregnated paper print sheet
{ 7 phenolic resin impregnated creped Kraft paper sheets
  7 epoxy resin impregnated glass sheets } alternately
2 phenolic resin impregnated creped Kraft paper sheets
1 phenolic resin impregnated Kraft paper sheet Laminate 2 - Flat, 0.145 inches thick Same make-up as laminate 1 except that there is only 1 phenolic resin impregnated creped Kraft paper next to the bottom of the laminate.

Laminate 3 - Concave warp, 0.153 inches thick

Same make-up as laminate 1 except that there is 1 phenolic resin impregnated Kraft paper sheet placed between the print sheet and the top core sheets and there is no phenolic resin impregnated Kraft paper sheet as the bottom sheet of the laminate.

Laminate 4 - Convex warp, 0.145 inches thick 1 alpha cellulose surface sheet
1 melamine resin impregnated paper print sheet
2 phenolic resin impregnated creped Kraft paper sheets
1 epoxy resin impregnated glass sheet
{ 9 glass scrim sheets
  9 phenolic resin impregnated creped Kraft paper sheets } alternately
1 phenolic resin impregnated creped Kraft paper sheet
1 phenolic resin impregnated Kraft paper sheet Laminate 5 - Convex warp, 0.145 inches thick Same as laminate 4 except that the 9 alternating sheets began with a phenolic resin impregnated creped Kraft paper sheet superimposed on a glass scrim sheet and not vice versa.

Laminate 6 - Very slightly convex, 0.138–0.140 inches thick

Same as laminate 5 except that the phenolic resin impregnated creped Kraft paper sheet next to the bottom of the laminate was replaced with 2 phenolic resin impregnated Kraft paper sheets.
In laminates 4–6, an epoxy impregnated glass sheet was placed above the core sheets to prevent the glass scrim in the core sheets from telegraphing onto the laminate surface.

EXAMPLE 7

Example 3 was repeated with a laminate having the following make-up:

1 alpha cellulose surface sheet having 25% silica incorporated therein
1 melamine resin impregnated paper print sheet
10 phenolic resin impregnated Kraft paper sheets
{ 2 phenolic resin impregnated creped Kraft paper sheets
  2 epoxy resin impregnated glass sheets } alternately
3 phenolic resin impregnated creped Kraft paper sheets
1 phenolic resin impregnated Kraft paper sheets (as described in Example 6 herein)

When tested with the bowling ball drop test from a vertical distance of 2 feet, the impact resistance of the laminate of this example was equivalent to that of laminates according to this invention having seven sheets of epoxy impregnated glass in the core.

The laminate was cemented to a test block of wood 12 inches by 15 inches and mounted on two pieces of 2"×4" lumber to simulate a bowling lane substructure. The assembly was then impacted by repeatedly dropping the bowling ball vertically two feet onto the center of the 12"×15" assembly. The results comparing three laminate assemblies made according to the procedure of this example are summarized in Table VII hereinbelow:

TABLE VII

| Assembly | Hits | Result |
| --- | --- | --- |
| Seven sheets of epoxy glass in the core | 1850 | ¾ inch crack (back of laminate) |
| Two sheets of epoxy glass in the core | 2500 | no cracks |
| Two sheets of epoxy glass in the core | 1910 | ½ inch crack (back of laminate) |

Failure in the back of the laminate occured when the assembly was under tension. Consequently, the bond of the laminate to the bowling lane and the condition of the bowling lane beneath the laminate are as important a factor as the laminate itself. However, regardless of application skill in bonding the laminate to the bowling lane, the laminates of this invention crack less under impact than laminates of the '604 application.

EXAMPLE 8

Five laminates were prepared according to the procedure of example 3 and had the following make-up:

1 alpha cellulose surface sheet
1 melamine resin impregnated paper print sheet
8 phenolic resin impregnated Kraft paper sheets
{ 4 phenolic resin impregnated creped Kraft paper sheets
  4 epoxy resin impregnated glass sheets } alternately
5 phenolic resin impregnated creped Kraft paper sheets
1 phenolic resin impregnated Kraft paper sheet These laminates were 0.187–0.189 inches thick and were sanded to a thickness of 0.185 inches. After sanding, they were nominally flat, i.e., the upper outer board (pressed face down) was very slightly concave to the face and the other four boards (pressed face up) were either slightly convex or flat. A laminate as prepared in this example would be optimized balancewise by reducing the eight phenolic impregnated Kraft paper sheets to seven and increasing the five phenolic impregnated creped Kraft paper sheets to six. The thicker laminate of this example would crack even less under impact than the laminates of the previous seven examples.

Although the invention has been illustrated by the preceding examples, it is not to be construed as being limited thereto, but rather the invention is directed to the generic area as hereinbefore disclosed. Various modifications and embodiments may be made without departing from the spirit and scope thereof.

What is claimed is:

1. In a decorative plastic laminate sheet of a length and width for securing to a substrate selected from the group consisting of natural wood, consolidated wood fibers, plywood, flakeboard, chipboard, and hardboard to form therewith all or part of a bowling lane having a surface characterized by a falling ball impact resistance of at least 60 inches, a coefficient of fraction of about 0.16 and a Taber abrasion resistance of at least 500 cycles, said plastic laminate sheet comprising a plurality of thermosetting resin impregnated fibrous core sheets, a melamine resin impregnated decorative fibrous print sheet overlying one of said fibrous core sheets in a contiguous manner, and a melamine resin containing protective layer overlying said decorative fibrous print sheet in a contiguous manner, the improvement which comprises:

said fibrous core sheets being comprised of individual, adjacent, contiguous and alternating glass fiber fabric sheets and crepe paper sheets, said glass being selected from the group consisting of woven glass cloth, glass net and glass scrim, the interlaminer bond strength between said glass and crepe paper sheets being substantially equal to the interlaminer bond strength between resin impregnated paper core sheets.

2. In a bowling lane having a surface characterized by a falling ball impact resistance of at least 60 inches, a coefficient of friction of at least 0.16 and a Taber abrasion resistance of at least about 500 cycles, said bowling lane comprised of a substrate selected from the group consisting of natural wood, consolidated wood fibers, plywood, flakewood, chipboard and hardboard, and at least one decorative plastic laminate secured to the surface of said substrate, said plastic laminate being comprised of a plurality of thermosetting resin impregnated fibrous core sheets, a melamine resin impregnated decorative fibrous print sheet overlying one of said fibrous core sheets in a contiguous manner and a melamine resin containing protective layer overlying said decorative fibrous print sheet in a contiguous manner, the improvement which comprises:

said fibrous core sheets being comprised of individual, adjacent, contiguous and alternating glass fiber fabric sheets and crepe paper sheets, said glass being selected from the group consisting of woven glass cloth, glass net and glass scrim, the interlaminer bond strength between said glass and the crepe paper sheets being substantially equal to the interlaminer bond strength between resin impregnated paper core sheets.

3. A bowling lane as defined in claim 2 wherein said net has at least 10 strands per inch.

4. A bowling lane as defined in claim 2 said glass scrim has a mass per unit area between about 1 and 12 ounces per square yard.

5. A bowling lane as defined in claim 2 wherein said glass fabric sheets are impregnated with an epoxy or phenolic resin.

6. A bowling lane as defined in claim 2 wherein said crepe paper sheets are impregnated with a phenolic resin.

7. A bowling lane as defined in claim 2 wherein the number of glass sheets in the core of said laminate is sufficient to double the impact resistance of the surface of said laminate over a substantially identical laminate without said glass sheets in the core thereof.

8. A bowling lane as defined in claim 2 wherein the overlying protection layer is a fibrous sheet impregnated with the melamine resin.

9. A bowling lane as defined in claim 2, wherein said overlying protective layer has abrasion resistant material incorporated therein.

10. A bowling lane as defined in claim 2, wherein the fibrous print sheet is paper.

11. A bowling lane as defined in claim 2 wherein each of said glass sheets is situated contiguously between two of said crepe paper sheets.

12. A bowling lane as defined in claim 11 wherein said glass sheets are situated between said crepe paper sheets in an alternating sequence.

* * * * *